(12) United States Patent
Suarez

(10) Patent No.: US 11,534,351 B1
(45) Date of Patent: Dec. 27, 2022

(54) WHEELCHAIR COMPRISING A MECHANICAL ARM FOR ASSISTING A USER

(71) Applicant: Juvenal Suarez, Boynton Beach, FL (US)

(72) Inventor: Juvenal Suarez, Boynton Beach, FL (US)

(*) Notice: Subject to any disclaimer, the term of this patent is extended or adjusted under 35 U.S.C. 154(b) by 477 days.

(21) Appl. No.: 16/710,045

(22) Filed: Dec. 11, 2019

(51) Int. Cl.
| A61G 5/10 | (2006.01) |
| B25J 13/00 | (2006.01) |
| B25J 11/00 | (2006.01) |
| B25J 9/00 | (2006.01) |

(52) U.S. Cl.
CPC .............. *A61G 5/10* (2013.01); *B25J 9/0087* (2013.01); *B25J 11/009* (2013.01); *B25J 13/003* (2013.01)

(58) Field of Classification Search
CPC ........................................................ A61G 5/10
USPC ....................................................... 280/250.1
See application file for complete search history.

(56) References Cited

U.S. PATENT DOCUMENTS

| 5,100,091 | A | * | 3/1992 | Pollak | ........................ | A61G 5/10 |
| | | | | | | 248/278.1 |
| 5,921,258 | A | * | 7/1999 | Francois | .............. | A61G 5/1054 |
| | | | | | | 135/117 |
| 8,056,874 | B2 | * | 11/2011 | Goodwin | .................. | A61G 5/10 |
| | | | | | | 403/112 |
| 9,943,171 | B1 | * | 4/2018 | Simpson | .................... | A61G 5/10 |
| 10,265,227 | B2 | | 4/2019 | Wen et al. | | |
| 2020/0268578 | A1 | * | 8/2020 | Fleming | ................. | A61G 5/104 |

FOREIGN PATENT DOCUMENTS

| CN | 108670595 | A | * | 10/2018 | ............... | A61G 5/00 |
| CN | 110151413 | A | * | 8/2019 | | |
| CN | 113262109 | A | * | 8/2021 | | |
| CN | 111544216 | B | * | 4/2022 | ............... | A61G 5/04 |

* cited by examiner

*Primary Examiner* — Jacob D Knutson
*Assistant Examiner* — Hosam Shabara
(74) *Attorney, Agent, or Firm* — Sanchelima & Associates, P.A.; Christian Sanchelima; Jesus Sanchelima

(57) ABSTRACT

A wheelchair comprising a mechanical arm for assisting a user is disclosed. The mechanical arm includes a first arm mounted to a first armrest of the wheelchair. The mechanical arm includes a second arm mounted to the first arm via a first swivel rod. The second arm is made to swivel with respect to the first arm. The mechanical arm includes a third arm mounted to the second arm. The third arm is made to swivel with respect to the second arm. The mechanical arm includes claws. The wheelchair includes a controller provided at a second armrest of the wheelchair. The controller is used to operate the first arm, the second arm and the third arm to align the mechanical arm with an object. The controller is also used to operate the claws for gripping and releasing an object.

8 Claims, 8 Drawing Sheets

WHEELCHAIR COMPRISING A MECHANICAL ARM FOR ASSISTING A USER

BACKGROUND OF THE INVENTION

1. Field of the Invention

The present disclosure generally relates to wheelchairs. More specifically, the present disclosure relates to a wheelchair comprising a mechanical arm for assisting a user such as an elderly or mobility-impaired individual.

2. Description of the Related Art

Several designs for mechanical arms for wheelchairs have been designed in the past. None of them, however, include a telescopic retractable arm and gripping claw attached to a wheelchair arm rest comprising a mechanical motorized system for extending and retracting the telescopic arm as well as operating the gripping claw. It is known that elderly or mobility-impaired individuals or handicapped individuals find it difficult to pick up objects, which are out of their reach weather the objects are on the floor or on a shelf. It is particularly difficult for the elderly or mobility-impaired individuals who are confined to wheelchairs or in bed to move around to reach objects and/or to pick the objects. This is because the elderly or mobility-impaired individuals may lack sufficient strength in their hands to properly grip the object, even if they could pick up the objects with their hands.

Although caretakers can be employed to help the elderly or mobility-impaired individuals with their daily activities and to help them in picking up the objects, employing the caretakers might be expensive. Several attempts have been made in the past to develop rehabilitation tools, which might assist or support the everyday lives of elderly or mobility-impaired individuals. Examples of rehabilitation tools include a mechanical aid such as a robotic arm mounted to the wheelchair that the elderly or mobility-impaired individuals might be using. The elderly or mobility-impaired individuals may operate the robotic arm to grip the objects and/or move the objects from one place to another.

Several examples of the wheelchair provided with a robotic arm have been disclosed in the past. One such example is disclosed in a United States granted patent 10265227. In U.S. Ser. No. 10/265,227B2, it is disclosed that a robotic assistant, associated software and methodology for operating the same. The described robotic assistant includes: a motorized base having at least two motor driven wheels controlled by a first control platform; a dual arm robot mounted on the motorized base, the dual arm robot having a first arm and a second arm controlled by a second control platform; a remote sip and puff mouth controller having three degrees of operational freedom; and a computer system that receives command signals from the remote sip and puff mouth controller, and includes an algorithm that translates the command signals into a first type of control signal for directing the motorized base to move, and a second type of control signal for directing the dual arm robot to move.

Another example in which a wheelchair is provided with a mechanical arm is disclosed in a United States patent application 20070095582. In US20070095582A1, it is disclosed that the invention relates to a wheelchair, provided with a seat at a first level and a backrest, supported by an undercarriage, and at least one armrest, located at a second level, above said first level, wherein a mechanical arm is provided, comprising a series of segments, driven by at least one motor, wherein the mechanical arm is foldable and/or retractable into a position wherein the mechanical arm extends virtually completely below said armrest, preferably completely below said second level or virtually completely behind or next to the backrest, at least such that, in folded and/or retracted position, the mechanical arm is virtually completely inside an outer contour of the wheelchair.

Although the mechanical or robotic arms discussed above are capable of gripping and/or moving objects from one place to another, they have few problems. For instance, the construction of the mechanical arms to the wheelchair is complex and the mechanical arm takes up much of the space at one or both sides of the wheelchair. Further, the wheelchairs are provided with toggles to operate the robotic arms. Operating the toggles require considerable strength. As a result, most of the elderly or mobility-impaired individuals may not be able to operate the mechanical arm for gripping the objects.

Other documents describing the closest subject matter provide for a number of more or less complicated features that fail to solve the problem in an efficient and economical way. None of these patents suggest the novel features of the present invention. Specifically, none of the disclosures in the art disclose a wheelchair comprising a mechanical arm for assisting mobility-impaired individuals, the mechanical arm which is easy to operate.

Therefore, there is a need to provide a wheelchair comprising a mechanical arm for assisting mobility-impaired individuals.

SUMMARY OF THE INVENTION

It is one of the objects of the present invention to provide a wheelchair comprising a mechanical arm for assisting mobility-impaired individuals and that avoids the drawbacks of the prior art.

It is one object of the present invention to provide a mechanical arm mounted a wheelchair for helping mobility-impaired individuals to do simple household chores such as taking out trash or to hold objects.

It is one object of the present invention to provide a wheelchair comprising a mechanical arm for assisting a user that can be controlled or operated by voice commands.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses a wheelchair comprising a mechanical arm for assisting a user. The mechanical arm comprises a first arm mounted to a first armrest of the wheelchair. The mechanical arm comprises a second arm mounted to the first arm via a first swivel rod. The second arm is made to swivel with respect to the first arm with the help of the first swivel rod. The mechanical arm comprises a third arm mounted to the second arm via a second swivel rod. The third arm is made to swivel with respect to the second arm with the help of the second swivel rod. The mechanical arm comprises claws mounted to the third arm. The wheelchair comprises a controller provided at a second armrest of the wheelchair. The controller is used to operate the first arm, the second arm and the third arm to align the mechanical arm with an object. The controller is used to operate the claws for gripping the object, and to adjust the position of the first arm, the second arm and the third arm. The controller is used to release the claws for releasing the object.

Various features and embodiments of a wheelchair comprising a mechanical arm for assisting a user are explained in conjunction with the description of FIGS. 1-7.

Figure 1:
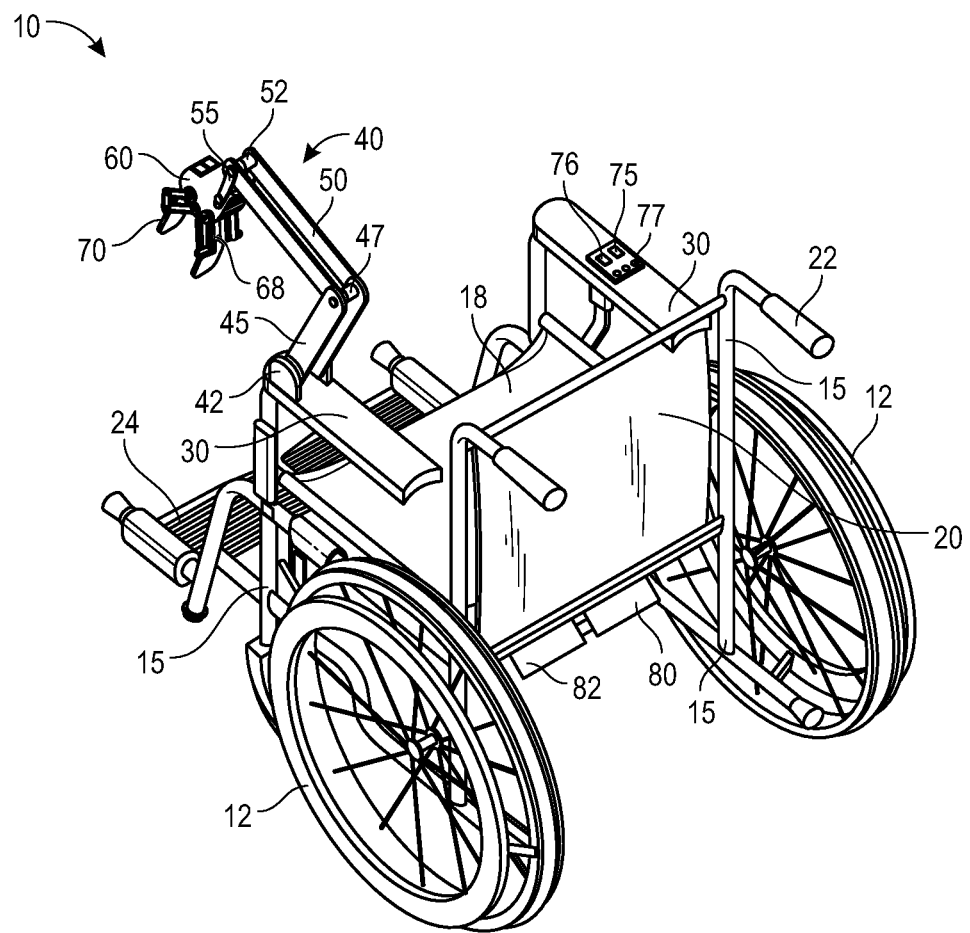
FIG. 1 illustrates a rear perspective view of a wheelchair 10 comprising a mechanical arm 40 for assisting a user or patient, in accordance with one embodiment of the present disclosure.

Referring to FIG. 1, a rear perspective view of a wheelchair 10 comprising a mechanical arm 40 for assisting a user or patient or mobility-impaired individual is shown, in accordance with one embodiment of the present disclosure. The wheelchair 10 comprises wheels 12. The wheelchair 10 comprises a frame 15 mounted to the wheels 12. The frame 15 might be made up of metal or any other suitable material. Further, the wheelchair 10 comprises a seat 18 made up of cushion or fabric or any other suitable material. The seat 18 is used for the patient to sit on. Further, the wheelchair 10 comprises a backrest 20 mounted to the seat 18 with the help of the frame 15. As known, the backrest 20 is used for resting back of the patient while sitting on the seat 18. Further, the wheelchair 10 comprises handles 22 mounted to the frame 15 in proximity to the backrest 20. The handles 22 might be used to push or maneuver the wheelchair 10 from one place to another. Further, the wheelchair 10 comprises a footrest 24 mounted to the frame 15. The footrest 24 is used for placing feet of the user while being seated on the seat 18.

Figure 2:
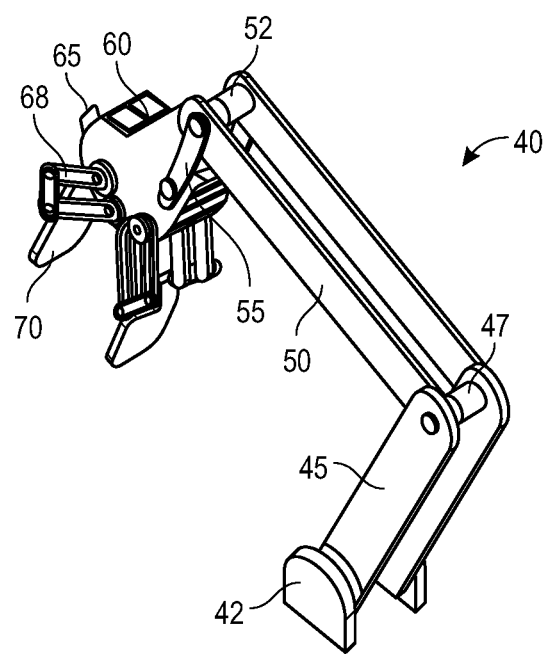
FIG. 2 illustrates the mechanical arm 40, in accordance with one embodiment of the present disclosure.
Figure 3:
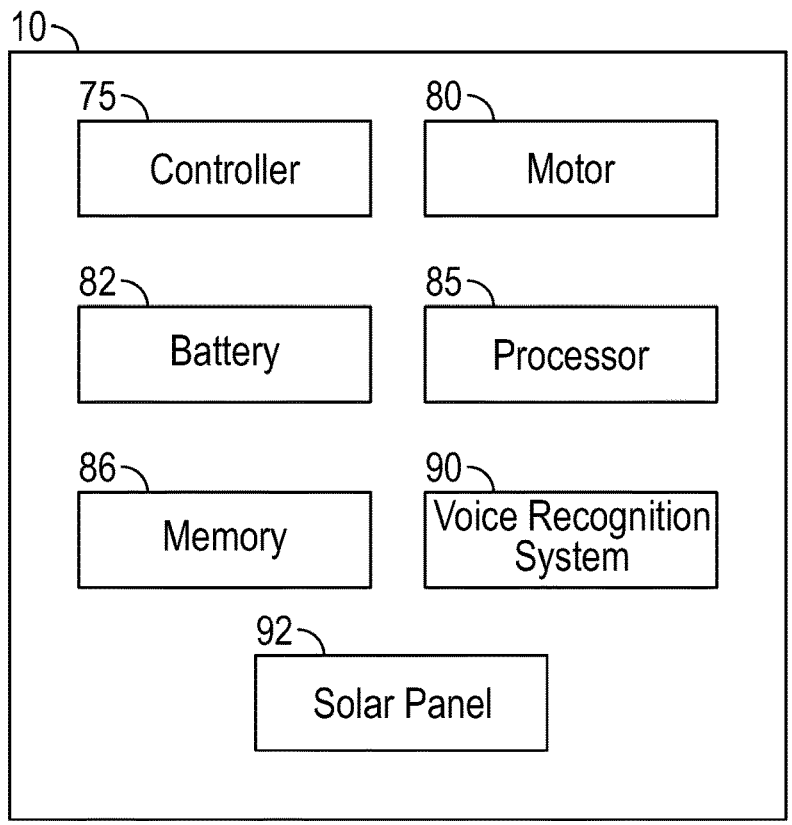
FIG. 3 illustrates a block diagram of the wheelchair 10, in accordance with one embodiment of the present disclosure.

Furthermore, the wheelchair 10 comprises armrests 30 mounted to the frame 15. The armrests 30 are used for placing hands of the user while being seating on the seat 18. The wheelchair 10 further comprises a mechanical arm or robotic arm 40. Referring to FIGS. 1 and 2, the mechanical arm 40 is explained. As can be seen from FIG. 1, the mechanical arm 40 is provided at one of armrests 30. In other words, the mechanical arm 40 is mounted to a first armrest 30 of the wheelchair 10. The mechanical arm 40 comprises a clamp 42 used to mount the mechanical arm 40 to the armrest 30. In one example, the mechanical arm 40 is permanently mounted to the armrest 30 using known mechanisms such as welding. In another example, the mechanical arm 40 is removably mounted to the armrest 30 such as fasteners, adhesive and other known mechanism.

The mechanical arm 40 further comprises a first arm 45. Further, the first arm 45 is mounted to a second arm 50 using a first swivel rod 47. It should be understood that the first swivel rod 47 allows the second arm 50 swing with respect to the first arm 45. Further, the second arm 50 is mounted to a third arm 55. The second arm 50 is mounted to the third arm 55 using a second swivel rod 52. It should be understood that the second swivel rod 52 allows the third arm 55 swing with respect to the second arm 50. Further, the mechanical arm 40 comprises a housing 60. The housing 60 might be made of metal, plastic or any other material. The housing 60 might be provided with one or more sensors 65 at its outer surface. The one or more sensors 65 may include a sensor such as a camera, a positioning sensor and so on. The one or more sensors 65 might be used to position the mechanical arm 40. Further, the mechanical arm 40 comprises claws 70 mounted to the housing 60 using with the help of support arms 68. The claws 70 may indicate a handle provided in a U-shape structure, which are squeezed to hold objects, and released to disengage the objects being held.

It should be understood that each of the clamp 42, the first arm 45, the first swivel rod 47, the second arm 50, the second swivel rod 52, the third arm 55, the support arms 68 and the claws 70 might be made up of metal. However, a person skilled in the art will appreciate that each of the clamp 42, the first arm 45, the first swivel rod 47, the second arm 50, the second swivel rod 52, the third arm 55, the support arms 68 and the claws 70 may also be made up plastic or any other suitable material.

In the current embodiment, the wheelchair 10 comprises a controller 75 provided at the armrest 30. For example, considering that the mechanical arm 40 is provided at the left armrest (first armrest), and then the controller 75 is provided at the right armrest (second armrest), or vice versa. The controller 75 comprises a first controller 76 and a second controller 77. The function of the first controller 76 and the second controller 77 is explained in subsequent portion of the description.

Further, the wheelchair 10 is provided with a motor 80, and a battery 82 electrically mounted to the motor 80. In one example, the motor 80 and the battery 82 might be provided underneath the seat 18. In another example, the motor 80 and the battery 82 might be mounted to the frame 15. Now referring to FIG. 3, the wheelchair 10 may comprise a processor 85 and a memory 86 provided in a housing in proximity to the motor 80 and the battery 82. Battery 82 may be rechargeable. In one embodiment, battery 82 may be solar powered by solar panels 92 mounted thereon the present invention. The solar panels 92 might be mounted at a predetermined location on wheelchair 10.

The processor 85 may be implemented as one or more microprocessors, microcomputers, controllers, digital signal processors, central processing units, state machines, logic circuitries, and/or any devices that manipulate signals based on operational instructions. Among other capabilities, the processor 85 is configured to fetch and execute computer-readable instructions or program instructions stored in the memory 86.

The first memory 86 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

In addition, the wheelchair 10 may comprise a voice recognition system 90. The voice recognition system 90 might be provided in proximity to the backrest 20 such that the when the user or the patient sits on the seat 18, the voice recognition system 90 comes in proximity to the mouth i.e., face of the user such that the user will be able to provide voice commands to the voice recognition system 90. In another example, the voice recognition system 90 might be mounted to the armrest 30 of the wheelchair 10, in that the voice recognition system 90 is mounted to an elongated rod (not shown) mounted to the armrest 30 extended to the face of the user when being seated on the seat 18. The voice recognition system 90 might be operatively or communicatively mounted to the processor 85.

It should be understood that the motor 80 is operatively or communicatively mounted to the mechanical arm 40. Further, the motor 80 is operatively or communicatively mounted to the processor 85. Furthermore, the processor 85 is operatively or communicatively mounted to the controller 75.

As specified above, the mechanical arm 40 might be used for gripping objects (not shown) and/or to move the objects from one place to another. The objects may include, but not limited to, cups, plates, dustbins, books, and so on. In order to operate the mechanical arm 40, the user or patient may sit on the seat 18. After being seated, the user may use one hand to operate the controller 75. In order to pick up objects placed on shelf or table or ground, the user may maneuver the wheels 12 to reach the object. After reaching, the user may operate the controller 75 to operate the mechanical arm 40 to grip or hold the object. In one example, the user may operate the first controller 76 to position the mechanical arm 40 by adjusting the first arm 45, the second arm 50 and the third arm 55 to align the mechanical arm 40 with the object. It should be understood that when the first controller 76 is operated, the first controller 76 sends signals to the processor 85. Subsequently, the processor 85 instructs the motor 80 to control the operation of the first arm 45, the second arm 50 and the third arm 55 to align the mechanical arm 40 with the object.

After the mechanical arm 40 is made to align with the object, the user may operate the second controller 77 to operate the claws 70. It should be understood that the second controller 77 is operated to bring the claws 70 closer so as to grip the objects. Further, the claws 70 are separated to release the object held by the claws 70. As such, in order to grip the object, the second controller 77 is operated to separate the claws 70. In other words, the first controller 76 is operated to adjust the position of the mechanical arm 40 and the second controller 77 and the second controller 77 is operated to bring the claws 70 closer to hold or grip the object. After gripping the object, the user may maneuver the wheelchair 10 with the help of the wheels 12 to reach a desired destination. Consider the object that needs to be picked is a dustbin or waste receptacle. The user may use the mechanical arm 40 to grip and lift the dustbin from inside a room and maneuver the wheelchair 10 to reach outside the house. After reaching the destination, the user may operate the second controller 77 to release the claws 70 to place the object in a desired place. After use, the user may operate the first controller 76 to bring the first arm 45, the second arm 50 and the third arm 55 closer in order to fold the mechanical arm 40.

Although it is explained that the mechanical arm 40 is operated using the controller 75 provided at the armrest 30, it is possible to operate the mechanical arm 40 using the voice recognition system 90. In order to operate the mechanical arm 40 for gripping the objects, the user may provide voice commands to the processor 85 via the voice recognition system 90. In one example, the processor 85 might be configured with predetermined voice commands for operating the mechanical arm 40. The predetermined voice commands may include, but not limited to, turn left, turn right, raise, lower, swivel, rotate clockwise, rotate anticlockwise, release, hold and so on. In addition, the voice recognition system 90 may also be used to operate the wheelchair 10. In order to operate the wheelchair 10, the motor 80 might be operatively mounted to the wheels 12 to maneuver the wheelchair 10 from one place to another.

In order to operate the mechanical arm 40, the user sitting on the wheelchair 10 may issue the voice commands via the voice recognition system 90. Subsequently, the voice recognition system 90 receives the signals and converts the signals such that the processor 85 may process the signals. Upon receiving the signals, the processor 85 instructs the motor 80 to operate the mechanical arm 40. Specifically, the mechanical arm 40 is operated based on the predetermined voice commands recognized by the processor 85. For example, the user may issue voice commands such as turn left and move upwards, to align the mechanical arm 40 with respect to the object. Subsequently, the user may issue voice commands such as "grip" or "hold" such that the claws 70 are made to hold or grip the objects. After gripping, the user may issue voice commands such that the wheelchair 10 is made to move from one place to another. After reaching the desired location, the user may issue a voice command such as "stop" for stopping the wheelchair 10. Subsequently, the user may a voice command such as "release" for the mechanical arm 40 for releasing the claws 70 so as to release object at the desired location.

Figure 8:
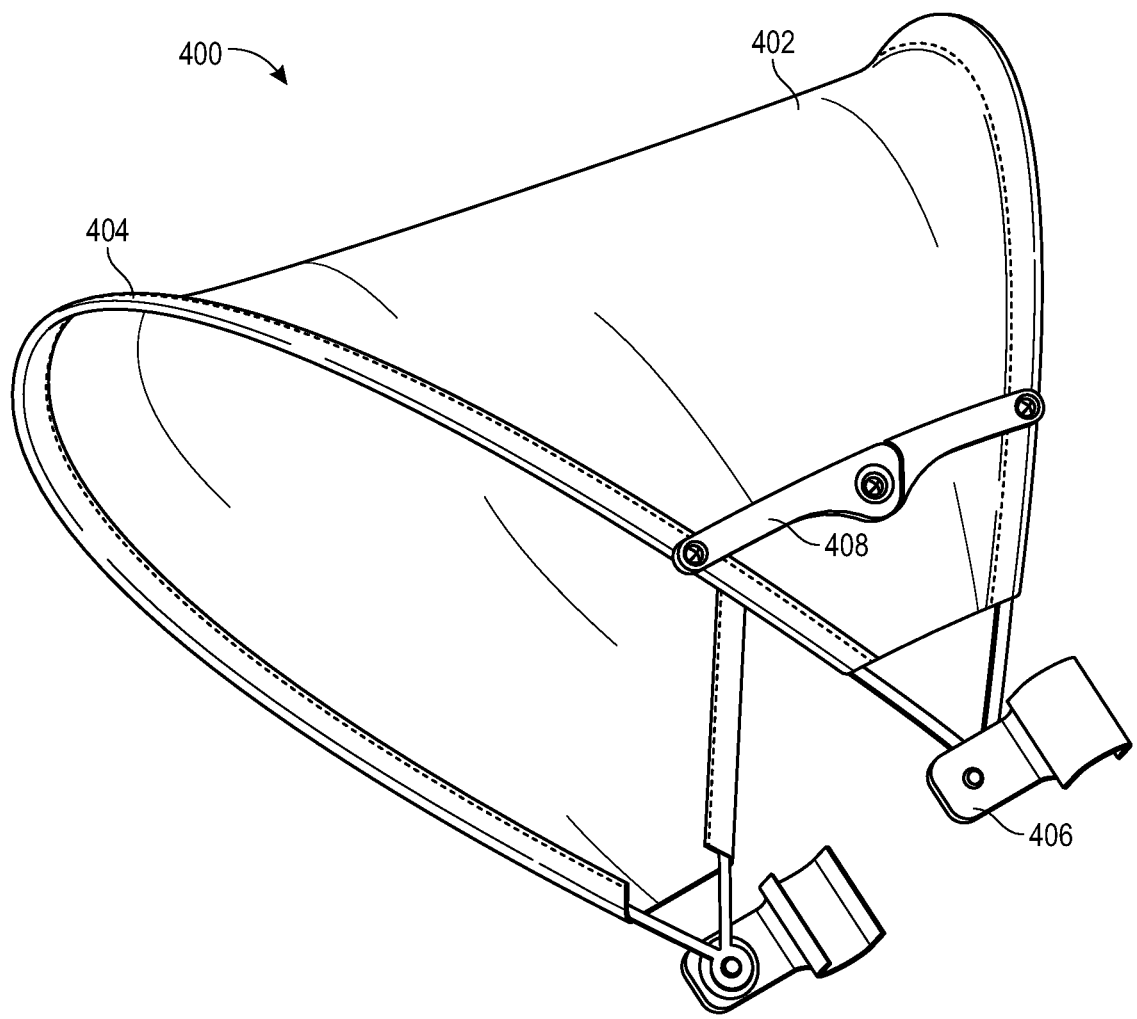
FIG. 8 illustrates an isometric view of a canopy 400, in an accordance with another embodiment of the present disclosure.
Figure 9:
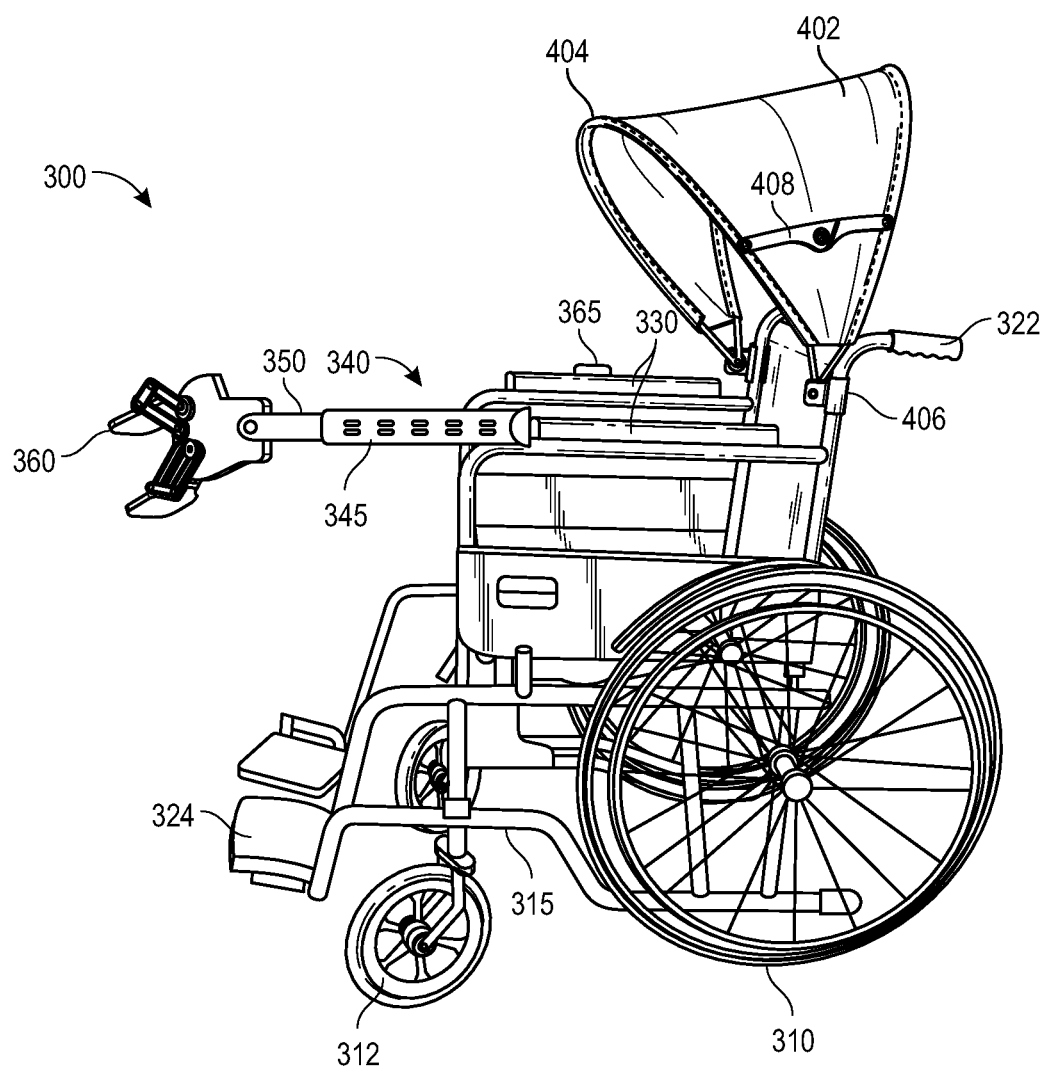
FIG. 9 illustrates the canopy 400 mounted to the present invention.

In an alternate embodiment, the present invention may include a canopy 400 that is mounted at a predetermined location on the present invention. Referring to FIG. 8, canopy 400 can be seen. The canopy 400 may include a cover 402 made of a suitable material. The cover 402 is provided with frames 404. Further, the frames 404 might be coupled to canopy claws 406. The canopy claws 406 might be used to mount the canopy 400 to the wheelchair 400. Further, the canopy 400 might be provided with a handle 408 for carrying the canopy 400 when not in use. Now referring to FIG. 9, the canopy 400 mounted to the present invention is seen, in accordance with one embodiment of the present disclosure. As can be seen, the canopy claws 406 are mounted to vertical frame of the present invention. After mounting the canopy claws 406, the cover 402 is adjusted to position the canopy 400 to provide shade to the user sitting on the present invention. When the canopy 400 is not needed, the user may remove the canopy 400 by demounting the claws 408 from the vertical frame of the present invention. Upon demounting, the cover 402 can be collapsed and carried by the user. The canopy 400 may have an open and closed configuration. In the open configuration, the removable umbrella may provide shade. In the closed configuration, the removable umbrellas may be detached from the present invention and stored or simply remain closed and mounted to the present invention.

Although it is explained that one mechanical arm is provided at one of the armrests, it is possible to provide two mechanical arms, one mounted to left armrest and other mounted to right armrest.

Figure 4:
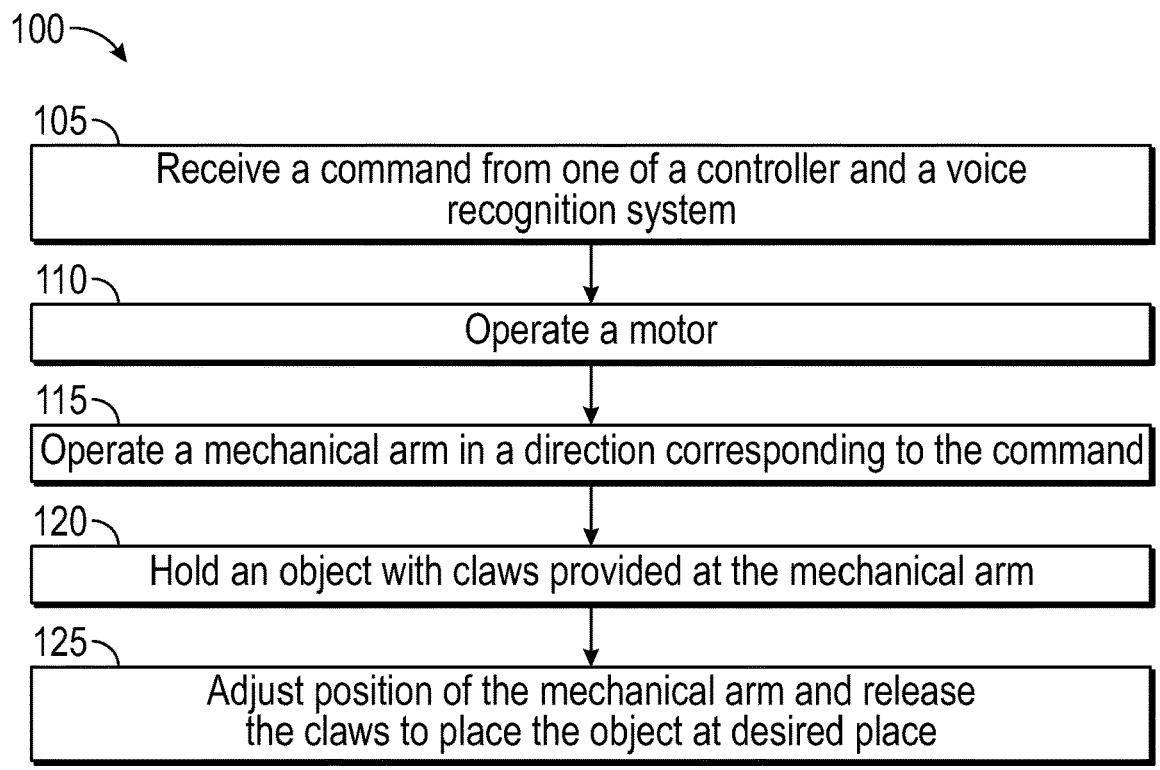
FIG. 4 illustrates a method 100 of assisting a user or patient, in accordance with one embodiment of the present disclosure.

Referring now to FIG. 4, a method 100 for operating a mechanical arm is shown, in accordance with an embodiment of the present disclosure. The method 100 may be described in the general context of computer executable instructions or a sequence of steps to be performed for automated checkout. However, the order in which the method 100 is described and is not intended to be construed as a limitation, and any number of the described method blocks can be combined in any order to implement the method 100 or alternate methods. Additionally, individual blocks may be deleted from the method 100 without departing from scope of the disclosure described herein. For ease of explanation, in the embodiments described below, the method 100 may be implemented in the above-described wheelchair 10 comprising the mechanical arm 40.

At step 105, the mechanical arm 40 is provided with a command from one of the controller 75 and the voice recognition system 90. The command may include an instruction to grip an object or to maneuver the wheelchair 10 from one place to another.

At step 110, the processor 85 processes the command and instructs the motor 80 to operate the mechanical arm 40.

At step 115, the motor 85 is used to operate the mechanical arm 40, in that the mechanical arm 40 comprising the first arm 45, the second arm 50 and the third arm 55 are aligned with the object in a direction corresponding to the command. In other words, the first arm 45, the second arm 50 and the third arm 55 are operated based on the command received.

At step 120, the claws 70 provided at the mechanical arm 40 are operated to hold or grip the object.

At step 125, the wheelchair 10 might be moved from one place to another and the controller 75 or the voice recognition system 90 might be used to instruct the mechanical arm 40 to adjust the position of the first arm 45, the second arm 50 and the third arm 55 and to release the claws 70 for placing the object at a desired place.

Figure 5:
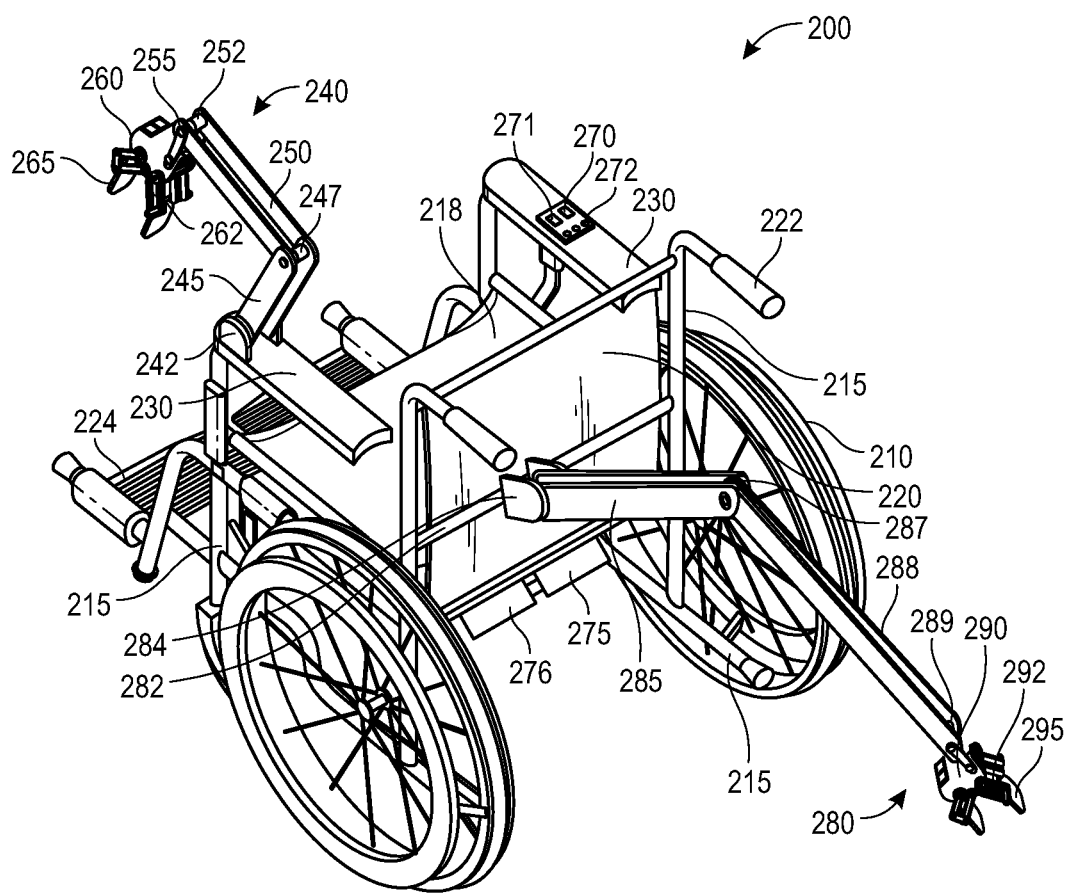
FIG. 5 illustrates a rear perspective view of a wheelchair 200 comprising two mechanical arms i.e., a first mechanical arm 240 and a second mechanical arm 280 for assisting a user or patient, in accordance with another embodiment of the present disclosure.

Now referring to FIG. 5, a wheelchair 200 comprising a mechanical arm 240 for assisting a user or patient is shown, in accordance with another embodiment of the present disclosure. It should be understood that the current embodiment is shown to illustrate that the wheelchair 200 might be provided with more than one mechanical arm e.g., two mechanical arms whereby one mechanical arm is provided at the armrest and another mechanical arm is provided at a rear side i.e., at the backrest of the wheelchair.

As can be seen in FIG. 5, the wheelchair 200 comprises wheels 210. The wheelchair 200 comprises a frame 215 mounted to the wheels 210. The frame 215 might be made up of metal or any other suitable material. Further, the wheelchair 200 comprises a seat 218 made up of cushion or fabric or any other suitable material. Further, the wheelchair 200 comprises a backrest 220 mounted to the seat 218. As known, the backrest 220 is used for resting back of the patient while sitting on the seat 218. Further, the wheelchair 200 comprises handles 222 mounted to the frame 215 in proximity to the backrest 220. The handles 222 might be used to push or maneuver the wheelchair 200 from one place to another by another user such as a caretaker. Further, the wheelchair 200 comprises a footrest 224 mounted to the frame 215. The footrest 224 is used for placing feet of the user while being seated on the seat 218.

Furthermore, the wheelchair 200 comprises armrests 230 mounted to the frame 215. The armrests 230 are used for placing hands of the user while being seating on the seat 218. In the current embodiment, the wheelchair 200 comprises a first mechanical arm 240 provided at one of armrests 30 e.g., first armrest. The first mechanical arm 240 comprises a first clamp 242 used to mount the first mechanical arm 240 to the armrest 230. In one example, the first mechanical arm 240 is permanently mounted to the armrest 230 using known mechanisms such as welding. In another example, the first mechanical arm 240 is removably mounted to the armrest 230 such as fasteners, adhesive and other known mechanism. Further, the first mechanical arm 240 a first arm 245. Further, the first arm 245 is mounted to a second arm 250 using a first swivel rod 247. It should be understood that the first swivel rod 247 allows the second arm 250 to swing with respect to the first arm 245. Further, the second arm 250 is mounted to a third arm 255. The second arm 250 is mounted to the third arm 255 using a second swivel rod 252. It should be understood that the second swivel rod 252 allows the third arm 255 to swing with respect to the second arm 250.

Further, the mechanical arm 240 comprises a first housing 260. The first housing 260 might be made of metal, plastic or any other material. The first housing 260 might be provided with one or more sensors (not shown) at its outer surface. The one or more sensors may include a sensor such as a camera, a positioning sensor and so on. Further, the first mechanical arm 240 comprises first claws 265 mounted to the first housing 260 using with the help of first support arms 262.

In the current embodiment, the wheelchair 200 comprises a controller 270 at other armrest 230 e.g., a second armrest. For example, considering that the first mechanical arm 240 is provided at the left armrest (first armrest), and then the controller 270 is provided at the right armrest (second armrest), or vice versa. The controller 270 comprises a first controller 271 and a second controller 272. Further, the wheelchair 200 is provided with a motor 275 and a battery 276 electrically mounted to the motor 275. In one example, the motor 275 and the battery 276 might be provided underneath the seat 218. In another example, the motor 275 and the battery 276 might be mounted to the frame 215. Battery 276 may be rechargeable. In one embodiment, battery 276 may be solar powered by solar panels 92 mounted thereon the present invention.

Further, the wheelchair 200 might be provided with a second mechanical arm 280. In order to mount the second mechanical arm 280 to the wheelchair 200, a support bar or a plate 282 might be provided at the backrest 222 of the wheelchair 200. The support bar 282 might be made up of metal, plastic or any other suitable material. The support bar 282 might be permanently or temporarily mounted to the backrest 222 using known mechanisms such as welding, fasteners and so on. It should be understood that second mechanical arm 280 may be able to rotate about freely 360 degrees as per the needs of a user. This may allow for the user to maneuver and control the arm to achieve their daily requirements with more freedom. The user may for example grab a trashcan with second mechanical arm 280 and rotate second mechanical arm 280 to dispose of trash therein trashcan, for example. It should also be understood that second mechanical arm 280 may be removably attached to the present invention.

The second mechanical arm 280 comprises a second clamp 284 used to mount the second mechanical arm 280 to the support bar 282. In one example, the second mechanical arm 280 is permanently mounted to the support bar 282 using known mechanisms such as welding. In another example, the second mechanical arm 280 is removably mounted to the support bar 282 such as fasteners, adhesive and other known mechanism. Further, the second mechanical arm 280 a fourth arm 285. Further, the fourth arm 285 is mounted to a fifth arm 288 using a third swivel rod 287. It should be understood that the third swivel rod 287 allows the fifth arm 288 to swing with respect to the fourth arm 285. Further, the fifth arm 288 is mounted to a second housing 290 using a fourth swivel rod 289. Further, the second mechanical arm 280 is provided with second claws 295 mounted to the second housing 290 via second support arms 292.

As specified above, each of the second clamp 284, the fourth arm 285, the third swivel rod 287, the fifth arm 288, the fourth swivel rod 289, the second support arms 292 and the second claws 295 might be made up of metal. However, a person skilled in the art will appreciate that each of the second clamp 284, the fourth arm 285, the third swivel rod 287, the fifth arm 288, the fourth swivel rod 289, the second support arms 292 and the second claws 295 may also be made up plastic or any other suitable material.

In the current embodiment, the first controller 271 might be used to operate the first mechanical arm 240 and the second controller 272 might be used to operate the second mechanical arm 280. The user may sit on the seat 218 and operate the first controller 271 to control direction of the first mechanical arm 240 and may use the first controller 271 to grip and to release the objects, as explained above. Similarly, the user may operate the second controller 272 to control direction of the second mechanical arm 280 and may use the second controller 272 to grip and to release the objects.

It should be understood that size of the first mechanical arm 240 and the second mechanical arm 280 might be selected based on the need. Alternatively, the second mechanical arm 280 might be provided in a bigger size as compared to the first mechanical arm 240, or vice versa. The user may operate the first controller 271 and the second controller 272 simultaneously to operate both the first mechanical arm 240 and the second mechanical arm 280. Alternatively, the wheelchair 200 may be provided with a voice recognition system (not shown), similar to voice recognition system (shown in FIG. 3) for receiving voice commands from the user to operate the first mechanical arm 240 and the second mechanical arm 280 for gripping objects and to maneuver the wheelchair 200 from place to another.

Figure 6:
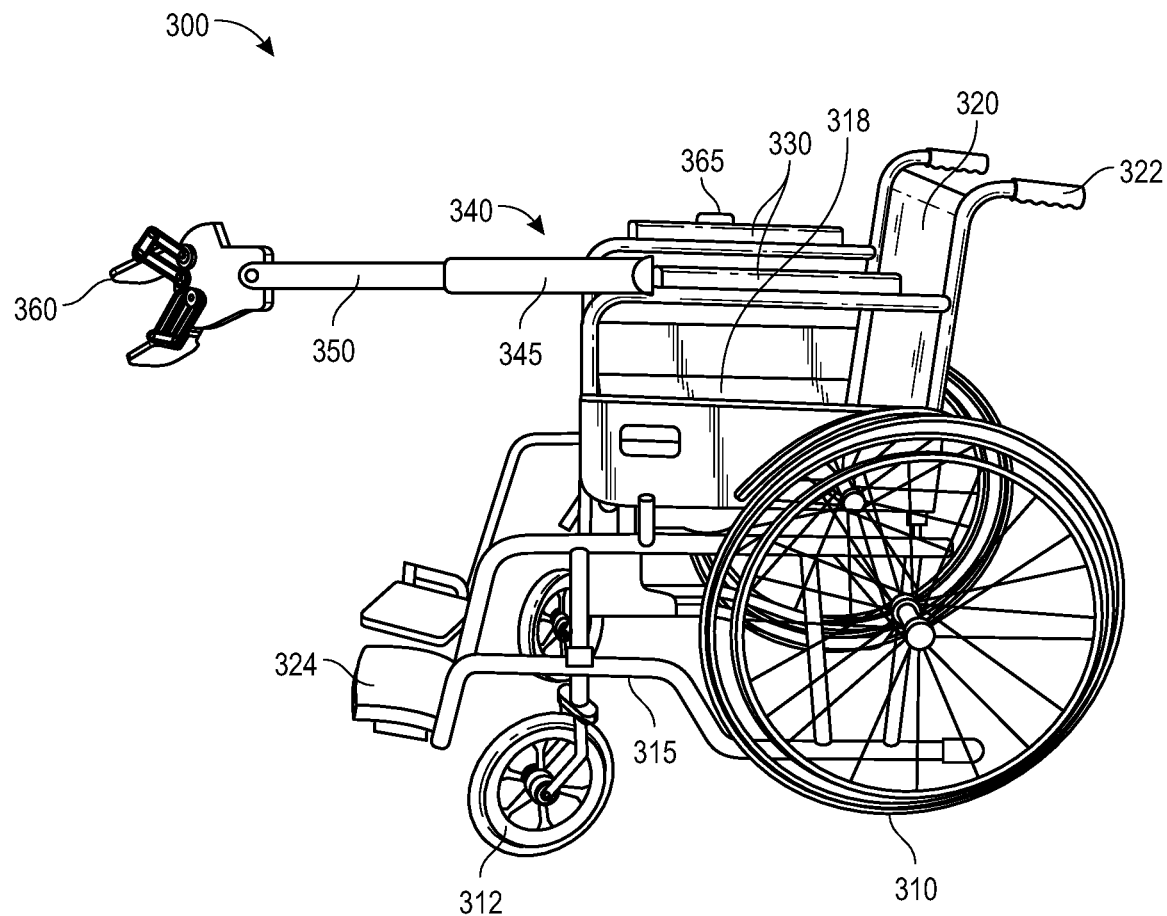
FIG. 6 illustrate a side perspective view of a wheelchair 300 comprising a retractable mechanical arm 340, in accordance with another embodiment of the present disclosure.
Figure 7:
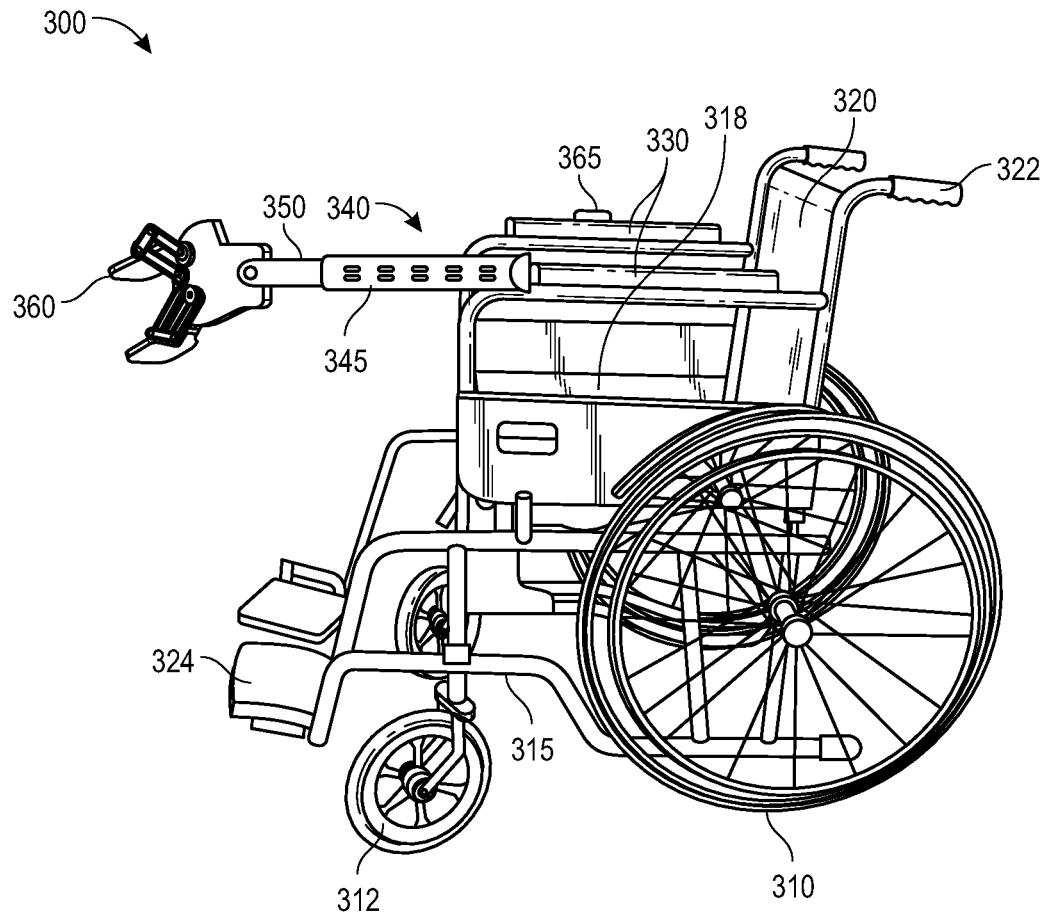
FIG. 7 illustrates an alternate embodiment of the present invention.

Now referring to FIGS. 6 and 7, a wheelchair 300 comprising a mechanical arm 340 for assisting a user or patient in gripping an object is shown, in accordance with another embodiment of the present disclosure. In the current embodiment, the wheelchair 300 comprises wheels 310. The wheelchair 300 comprises support wheels 312. As can be seen, the wheelchair 300 comprises a frame 315 mounted to the wheels 310 and the support wheels 312. The frame 315 might be made up of metal or any other suitable material. Further, the wheelchair 300 comprises a seat 318 made up of cushion or fabric or any other suitable material. Further, the wheelchair 300 comprises a backrest 320 mounted to the seat 318. As known, the backrest 320 is used for resting back of the patient while sitting on the seat 318. Further, the wheelchair 300 comprises handles 322 mounted to the frame 315 in proximity to the backrest 320. The handles 322 might be used to push or maneuver the wheelchair 300 from one place to another by another user such as a caretaker. Further, the wheelchair 300 comprises a footrest 324 mounted to the frame 315. The footrest 324 is used for placing feet of the user while being seated on the seat 318.

Furthermore, the wheelchair 300 comprises armrests 330 mounted to the frame 315. The armrests 330 are used for placing hands of the user while being seating on the seat 318. In the current embodiment, the wheelchair 300 comprises a mechanical arm 340 provided at one of armrests 330. In one example, the mechanical arm 340 is removably mounted to the armrest 330 such as fasteners, adhesive and other known mechanism. It should be understood that the mechanical arm 340 is provided in a telescopic arrangement. Specifically, the mechanical arm 340 comprises a first arm 345 and a second arm 350 whereby the second arm 350 is retrievable into the first arm 345 so as to adjust the length of the mechanical arm 340. In the current embodiment, the mechanical arm 340 comprises claws 360 provided at far end of the second arm 250.

In order to operate the mechanical arm 340, the wheelchair 300 is provided with a controller 365 at other armrest 330 of the wheelchair 300. For example, considering that the mechanical arm 340 is provided at the left armrest, and then the controller 365 is provided at the right armrest, or vice versa. As specified above, the user may operate the controller 365 with one hand to operate the mechanical arm 340 for gripping and for placing the objects from one place to another.

It should be understood that FIG. 6 is shown to illustrate the mechanical arm 340 in an extended position and the claws 360 in open position. Further, the FIG. 7 is shown to illustrate the mechanical arm 340 in retracted position and the claws 360 in closed position. Further, it should be understood that the controller 365 could be used to operate the claws 360 to hold or release objects when the mechanical arm 340 is in the extended position or in the retracted position.

Based on the above, it should be understood that the mechanical arm might be mounted to a wheelchair in which a user such as an elderly or mobility-impaired individuals might operate the controller provided at the armrest to grip the objects. The mechanical arm or arms of the present invention may rotate 360 degrees as to allow greater control and maneuverability. The mechanical arms may freely rotate and may also be removably mounted to a wheelchair. It should be understood that any of the mechanical arms are capable of holding items such as a bag, box, trash or virtually anything tangible. As such, the mobility-impaired individuals will be able to perform simple tasks at household such as taking out trash, moving small objects from place to another, without putting strain on their muscle. As a result, the mobility-impaired individuals will be able to depend less on a caretaker to perform the tasks specified above.

Although it is explained that the mechanical arm is operated using electric operation, the mechanical arm may also be operated using hydraulic means. As such, the disclosure is not limited to electrical operation of the mechanical arm to grip the objects.

In one alternate embodiment, the wheelchair might be provided with a remote controller to operate the mechanical arm. The remote controller might be provided in place of the controller as explained above. The remote controller might be carried by a caretaker or the patient sitting on the wheelchair and might be used to operate the mechanical arm for gripping and moving objects from one place to another.

It should be understood that mechanical arm might be integrated with the wheelchair or might be provided as an accessory that might be mounted whenever required. As such, the mechanical arm can be provided with new wheelchair or might be fitted to an existing wheelchair to assist the elderly or mobility-impaired individuals to perform simple household chores such as taking out the trash, picking utensils or other objects.

The mechanical arm might be provided in various sizes depending upon the need or the type of the objects that need to be gripped and/or to be moved from one place to another.

The drawings shown herein are provided for illustrative purpose only, and shape and size of each components illustrated should not be construed in limited sense. A person skilled in the art will appreciate that components may be added or deleted to incorporate additional features described in the present disclosure and even such disclosures will be within the scope of the present disclosure.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a wheelchair for assisting a user, the wheelchair comprising:
    a first mechanical arm including a first arm mounted to a first armrest of the wheelchair, a second arm mounted to the first arm via a first swivel rod, wherein the second arm is made to swivel with respect to the first arm with the help of the first swivel rod, a third arm mounted to the second arm via a second swivel rod, wherein the third arm is made to swivel with respect to the second arm with the help of the second swivel rod and first claws mounted to the third arm;
    a second mechanical arm mounted to a backrest of the wheelchair, wherein the second mechanical arm includes a fourth arm mounted to the backrest, a fifth arm mounted to the fourth arm via a fourth swivel rod, wherein the fifth arm is made to swivel with respect to the fourth arm with the help of the fourth swivel rod and second claws mounted to the fifth arm; and
    a controller provided at a second armrest of the wheelchair, wherein the controller includes a first controller and a second controller, wherein the first controller is used to operate the first arm, the second arm and the third arm to align the first mechanical arm with a first object, wherein the first controller is used to operate the first claws for gripping the first object, and to adjust the position of the first arm, the second arm and the third arm, and wherein the first controller is used to release the first claws for releasing the first object, wherein the second controller is used to operate the fourth arm and the fifth arm to align the second mechanical arm with a second object, wherein the second controller is used to operate the second claws for gripping the second object, and to adjust the position of the fourth arm and the fifth arm, and wherein the second controller is used to release the second claws for releasing the second object.

2. The system of claim 1, wherein the wheelchair includes a support bar provided at the backrest.

3. The system of claim 2, wherein the second mechanical arm is mounted to the support bar.

4. The system of claim 1, further includes a motor for operating the first mechanical arm and the second mechanical arm.

5. The system of claim 1, wherein the motor is powered by a battery.

6. The system of claim 1, wherein the battery is solar powered by solar panels mounted on said wheelchair.

7. The system of claim 1, further includes a voice recognition system for issuing voice commands to operate said first mechanical arm and said second mechanical arm.

8. A system for a wheelchair for assisting a user, the wheelchair comprising:
    a first mechanical arm including a first arm mounted to a first armrest of the wheelchair, a second arm mounted to the first arm via a first swivel rod, wherein the second arm is made to swivel with respect to the first arm with the help of the first swivel rod, a third arm mounted to the second arm via a second swivel rod, wherein the third arm is made to swivel with respect to the second arm with the help of the second swivel rod and first claws mounted to the third arm;
    a second mechanical arm mounted to a backrest of the wheelchair, wherein the second mechanical arm includes a fourth arm mounted to the backrest, a fifth arm mounted to the fourth arm via a fourth swivel rod, wherein the fifth arm is made to swivel with respect to the fourth arm with the help of the fourth swivel rod and second claws mounted to the fifth arm, wherein the wheelchair includes a support bar provided at the backrest, said second mechanical arm is mounted to the support bar, said system includes a motor, said motor is configured to operate said second mechanical arm and said first mechanical arm, said motor is powered by a battery, said battery is solar powered by solar panels mounted on said wheelchair;
    a voice recognition system for issuing voice commands to operate said first mechanical arm and said second mechanical arm; and
    a controller provided at a second armrest of the wheelchair, wherein the controller includes a first controller and a second controller, wherein the first controller is used to operate the first arm, the second arm and the third arm to align the first mechanical arm with a first object, wherein the first controller is used to operate the first claws for gripping the first object, and to adjust the position of the first arm, the second arm and the third arm, and wherein the first controller is used to release the first claws for releasing the first object, wherein the second controller is used to operate the fourth arm and the fifth arm to align the second mechanical arm with a second object, wherein the second controller is used to operate the second claws for gripping the second object, and to adjust the position of the fourth arm and the fifth arm, and wherein the second controller is used to release the second claws for releasing the second object.

* * * * *